(12) United States Patent
Eubanks

(10) Patent No.: US 8,751,570 B2
(45) Date of Patent: *Jun. 10, 2014

(54) INTERNET TRANSACTION AND USER INTERFACE THEREFOR

(71) Applicants: Sony Corporation, Tokyo (JP); Sony Electronics Inc., Park Ridge, NJ (US)

(72) Inventor: Gina C. Eubanks, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/916,991

(22) Filed: Jun. 13, 2013

(65) Prior Publication Data

US 2013/0275202 A1    Oct. 17, 2013

Related U.S. Application Data

(63) Continuation of application No. 13/348,550, filed on Jan. 11, 2012, now Pat. No. 8,539,049, which is a continuation of application No. 13/219,057, filed on Aug. 26, 2011, now Pat. No. 8,296,405, which is a continuation of application No. 12/623,282, filed on Nov. 20, 2009, now Pat. No. 8,051,150, which is a continuation of application No. 12/006,498, filed on Jan. 2, 2008, now Pat. No. 7,650,408, which is a continuation of application No. 09/661,578, filed on Sep. 14, 2000, now Pat. No. 7,330,884.

(51) Int. Cl.
*G06F 15/16* (2006.01)

(52) U.S. Cl.
USPC ............ 709/203; 709/220; 709/224; 709/228

(58) Field of Classification Search
USPC .................................. 709/203, 220, 224, 228
See application file for complete search history.

(56) References Cited

U.S. PATENT DOCUMENTS

| | | | |
|---|---|---|---|
| 7,617,136 B1 * | 11/2009 | Lessing et al. | 705/28 |
| 7,957,991 B2 * | 6/2011 | Mikurak | 705/7.11 |
| 8,539,049 B2 * | 9/2013 | Eubanks | 709/220 |
| 2007/0271156 A1 * | 11/2007 | Sarusi et al. | 705/27 |

* cited by examiner

Primary Examiner — Khanh Dinh
(74) Attorney, Agent, or Firm — John L. Rogitz

(57) ABSTRACT

A user account including a personal profile is stored by a server for subsequent use. The user is provided a list of displayable entries sortable using specified criteria in a manner that allows the user to review a selection of entries and to make a change to the selection prior to submitting a transaction for processing. Responsive to a request to log into the user account, the identity of the user is verified. Once verified, the transaction is facilitated between a vendor and the user pursuant to instructions from the user. The instructions are generated based on a shopping cart screen rendered by a client device of the user. The user is sent a confirmation message regarding the transaction while the user is logged in the server. The user can be provided an account screen allowing access to information relating to user transactions and information relating to an account balance.

20 Claims, 7 Drawing Sheets

INTERNET TRANSACTION AND USER INTERFACE THEREFOR

RELATED UNITED STATES PATENT APPLICATIONS

This application is a continuation of commonly-owned U.S. patent application Ser. No. 13/219,057 by G. Eubanks, filed on Aug. 26, 2011, entitled "Internet Strawman and User Interface Therefor," assigned to the assignee of the present invention, and hereby incorporated by reference in its entirety; which in turn is a continuation of commonly-owned U.S. patent application Ser. No. 12/623,282 by G. Eubanks, filed on Nov. 20, 2009, entitled "Internet Strawman and User Interface Therefor," now U.S. Pat. No. 8,051,150, assigned to the assignee of the present invention, and hereby incorporated by reference in its entirety; which in turn is a continuation of commonly-owned U.S. patent application Ser. No. 12/006,498 by G. Eubanks, filed on Jan. 2, 2008, entitled "Internet Strawman and User Interface Therefor," now U.S. Pat. No. 7,650,408, assigned to the assignee of the present invention, and hereby incorporated by reference in its entirety; which in turn is a continuation of commonly-owned U.S. patent application Ser. No. 09/661,578 by G. Eubanks, filed on Sep. 14, 2000, entitled "Internet Strawman and User Interface Therefor," now U.S. Pat. No. 7,330,884, also assigned to the assignee of the present invention, and also hereby incorporated by reference in its entirety.

BACKGROUND OF THE INVENTION

1. Field of the Invention

The present invention relates to the design of user interface in the context of electronic commerce. More specifically, the present invention pertains to a system and method for implementing an intermediary to preserve user privacy and anonymity in electronic transactions.

2. Related Art

In recent years, electronic commerce (e-commerce) has evolved to become an important part of modern commerce. New electronic storefronts spring up on the Internet daily, and many traditional sellers also have established their presence on the Internet or have plans to do in the near future. By way of background, the Internet is a worldwide collection of computer networks and gateways that generally use the TCP/IP suite of protocols to communicate with one another. The Internet allows easy access to media and data from a variety of sources, and is capable of delivering such information to users wherever they may be. Over the past few years, the Internet has experienced vast commercialization and has evolved into a worldwide information super-highway and database, containing information on every subject known to humankind.

The most prevalent and popular aspect of the Internet is the World Wide Web (also called the "Web"). The Web is an Internet facility that allows a server computer system (e.g., a Web server or a Web site) to send Web documents, commonly known as Web pages, to a remote client computer system. The remote client computer system can then display the Web documents using a Web browser. Typically, a Web page contains links (hyperlinks) that let users jump from page to page whether the pages are stored on the same server or on different servers around the world.

The Web has become the center of Internet activity since, among other reasons, Web pages, containing both text and graphics, provide a user-friendly graphical interface to the Internet. The Web is also conducive for conducting e-commerce. Many Web servers have been developed through which on-line vendors (e-vendors) can advertise and sell products and services. Some e-vendors provide an on-line catalog listing the items that are available. A user may browse through the on-line catalog using a browser and select various items that he/she desires to order. Typically, when the user has finished selecting the items, he/she is then prompted to enter his personal information, such as credit card information, shipping address, etc., so as to complete the ordering process. The Web server then confirms the order by sending a confirmation Web page to the client computer and schedules shipment of the ordered items.

Nevertheless, many consumers feel uneasy or are even unwilling to engage in these on-line transactions due to the lack of anonymity. More particularly, during an electronic transaction, information about the transaction (e.g., items ordered) as well as information of a personal nature (e.g., name, address, credit card number of the consumer) are typically and necessarily sent to the vendor. While aggregating such information may be invaluable to the vendors for various purposes, such as using the information to track the buying habits of consumers and/or directing targeted advertising to them, the majority of consumers prefer to remain anonymous in on-line transactions so that their privacy can be better preserved. Thus, it would be advantageous to provide a mechanism by which electronic transactions can be consummated without having to compromise the identity of individual consumers.

Another problem exists for consumers who patronize multiple e-vendors. Typically, each e-vendor requires a patron to establish a personal profile or account (e.g., setting up a user name and password) before a transaction can be entered into. The process of establishing such a profile or account must generally be repeated for each and every e-vendor that the consumer deals with as different e-vendors are usually not affiliated with one another and thus each maintains its own user accounts. Since these multiple accounts are created separately at different entities, more often than not they have different attributes, such as user names and passwords. Even where the consumer is allowed to choose his/her own user name, it is unlikely that the same user name can be had at the various e-vendors because a desired name is often already taken by another consumer. The situation is even less desirable where the e-vendor's system arbitrarily assigns a user name that does not bear any meaning to the consumer.

Due to the above reasons, an individual consumer who patronizes multiple e-vendors must therefore remember all of his/her user names and their respective passwords as well as which e-vendor's Web site they each corresponds to in order to access those sites to transact business. As such, apart from being unable to remain anonymous as described above, it is also very cumbersome, confusing and inconvenient for the consumer to have to manage numerous unrelated and sometime convoluted user names and passwords. Therefore, it would be very beneficial to have a mechanism whereby the consumer can conveniently transact business with multiple e-vendors without having to deal with numerous unrelated user names and passwords for accessing individual Web sites and to do so anonymously.

A different but related problem presents itself for consumers who patronize multiple e-vendors. Since each e-vendor maintains its own user accounts, a consumer who conducts business with multiple e-vendors would receive separate transaction statements and correspondence (e.g., billing statements, order confirmations, etc.) from each individual e-vendor. The large volume of records and correspondence generated would quickly become cumbersome and unwieldy for the consumer to manage. Therefore, it would be advantageous to provide a mechanism that helps the consumer avoid having to handle vast amounts of records and correspondence from different e-vendors with whom the consumer transacts business.

Furthermore, it is appreciated that compatibility is essential in developing an interfacing mechanism. More specifically, different e-vendors are likely to set up different electronic storefronts (e.g., different Web site layout and navigation) in an e-commerce environment. Thus, it would be desirable to provide an interfacing mechanism for consumers to conveniently transact business with multiple e-vendors without compromising the individual consumer's identity and without the need to maintain numerous user names, passwords or transaction records such that the mechanism is compatible and applicable to differing Web sites that are present in the e-commerce environment.

SUMMARY OF THE INVENTION

It would be advantageous to provide a mechanism by which electronic transactions can be consummated without having to compromise the identity of individual consumers. Furthermore, it would also be advantageous for such a mechanism to allow the consumer to conveniently transact business with multiple e-vendors without the need to manage numerous unrelated user names and passwords or vast amounts of transaction records. Additionally, it would be desirable to provide a mechanism that is compatible and applicable to different Web sites that are present in the e-commerce environment.

Accordingly, the present invention provides a system and method for implementing an intermediary to preserve user privacy and anonymity in electronic transactions. By so doing, embodiments of the present invention promote broad consumer acceptance and participation in electronic transactions because of the added assurance that their personal information are better protected. Moreover, embodiments of the present invention greatly simplify the management of user names, passwords as well as record-keeping for on-line consumers by allowing each consumer to establish a single subscriber account through which transactions with different e-vendors can be conducted. Furthermore, embodiments of the present invention can be used to transact business at a wide spectrum of e-commerce Web sites which have different layouts and navigation paradigms, thereby providing a ubiquitous solution for the subscribing consumer. These and other advantages of the present invention not specifically mentioned above will become clear within discussions of the present invention presented herein.

More specifically, in one embodiment of the present invention, a computer implemented method for facilitating a transaction between a subscriber and a vendor through an intermediary is provided. In this embodiment, the method comprises the step of receiving at the intermediary personal information from the subscriber to establish a user account. The method also comprises the step of storing the personal information for subsequent access. The method further comprises the step of receiving a request from the subscriber to access the user account, upon which the subscriber's identity is verified by the intermediary against the personal information. The method also comprises the step of the intermediary entering into a transaction with the vendor on behalf of the subscriber based on the subscriber's instruction once the subscriber's identity is successfully verified. The method further comprises the step of notifying the subscriber upon completion of the transaction. Importantly, the transaction is completed without disclosing the subscriber's personal information to the vendor. As such, the consumer remains anonymous with respect to the vendor. In a specific embodiment, the present invention includes the above steps and further includes the step of preparing an account activity statement for the subscriber. In one embodiment, the present invention includes the above and further includes the step of receiving at the intermediary an item ordered from the vendor on behalf of the subscriber based on the subscriber's instruction, as well as the step of billing the subscriber for services rendered.

Embodiments of the present invention include the above steps and further comprise the step of receiving at the intermediary a post-delivery request about the item from the subscriber, and the step of handling the post-delivery request on behalf of the subscriber. Particularly, in a currently preferred embodiment, such a post-delivery request can be a return request, a repair request, an exchange request, a warranty submission request, or a rebate request.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Figure 1:
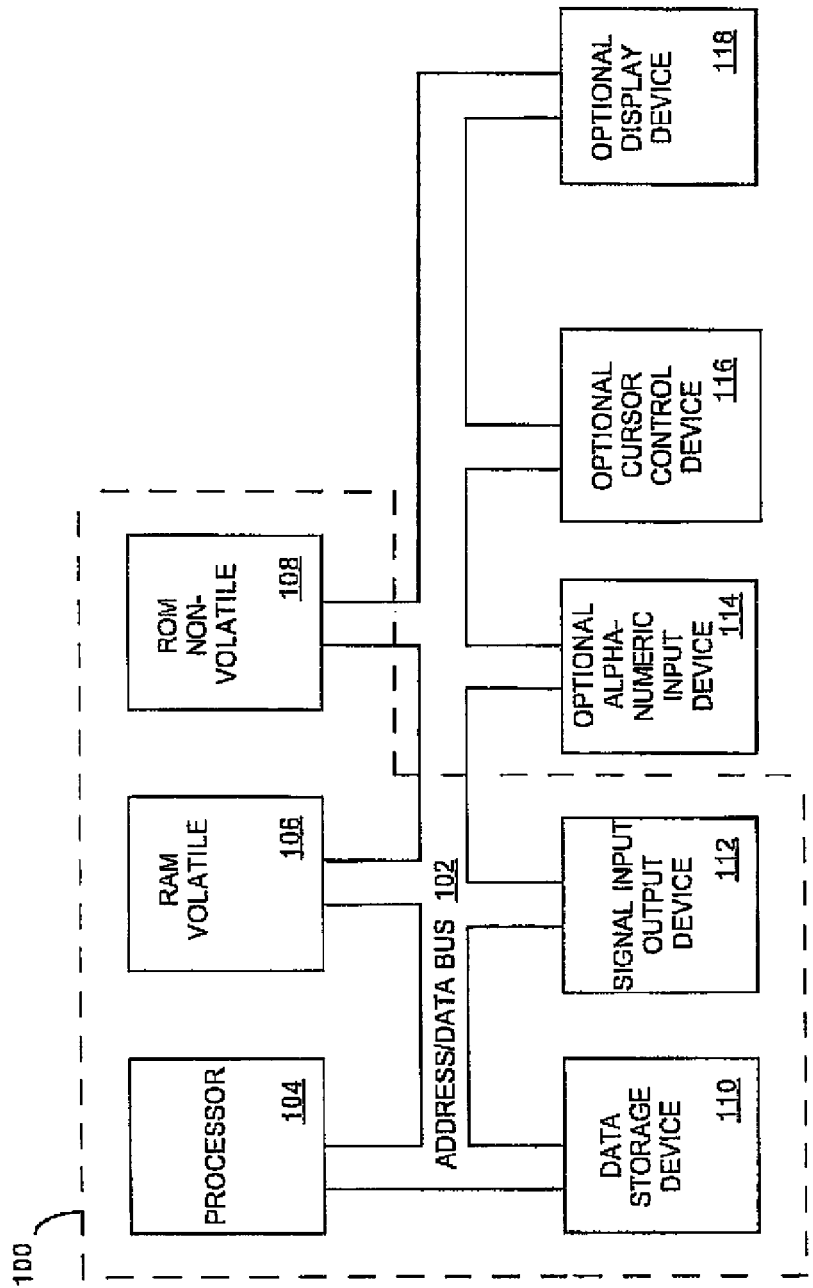
FIG. 1 is a schematic illustration of an exemplary computer system with which embodiments of the present invention can be implemented.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. To the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be clear to one of ordinary skill in the art that the present invention may be practiced without these specific details. In other instances, well known methods, procedures, components, and circuits have not been described in detail as not to unnecessarily obscure aspects of the present invention.

The following description of the present invention will begin with a description of the notation and nomenclature used in the present application and an exemplary configuration of a general purpose computer system on which embodiments of the present invention may be practiced. This description will then be followed by a detailed description setting forth the operation of the present invention.

Notation and Nomenclature

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities to achieve tangible and useful results. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving", "storing", "entering", "notifying" or the like, refer to the action and processes of a computer system (e.g., FIG. 1), or similar electronic computing device, that manipulates and transforms data represented as physical (electronic) quantities within the computer system's registers and memories into other data similarly represented as physical quantities within the computer system memories or registers or other such information storage, transmission or display devices. The present invention is also well suited to the use of other computer systems such as, for example, optical and mechanical computers.

Computer System Environment

FIG. 1 illustrates an exemplary computer system 100 used in accordance with embodiments of the present invention. Within the following discussions of the present invention, certain processes and steps are discussed that are realized, in certain embodiments, as a series of computer-readable and computer-executable instructions (e.g., process 300 as illustrated in FIG. 3) that reside, for example, in computer-usable media of computer system 100 and executed by processor(s) of computer system 100. When executed, the instructions cause computer system 100 to perform specific actions and exhibit specific behavior which is described in detail below. It is appreciated that computer system 100 of FIG. 1 is exemplary only and that the present invention can operate within a number of different computer systems including general purpose computer systems, embedded computer systems, and other computer systems specially adapted for transaction processing. Moreover, although not shown in FIG. 1, other modules and components can also be present in computer system 100 to perform various other functions that are not related to implementing an intermediary for facilitating a transaction between a subscriber and a vendor and thus are not within the scope of the present invention.

Computer system 100 of FIG. 1 includes an address/data bus 102 for communicating information, and a central processor unit (CPU) 104 coupled to bus 102 for processing information and instructions. Within the scope of the present invention, processor 104 can be a specialized processor that is optimized for transaction processing and/or network communications. Computer system 100 also includes a signal input output communication device 112 (e.g., a modem, a network interface card (NIC)) coupled to bus 102 for interfacing with other computer systems over a communication network.

Computer system 100 also includes data storage features such as a computer-usable volatile memory 106 (e.g., random access memory (RAM)) coupled to bus 102 for storing information and instructions for central processor unit 104, computer-usable non-volatile memory 108 (e.g., read only memory (ROM)) coupled to bus 102 for storing static information and instructions for central processor unit 104, and a data storage device 110 (e.g., a magnetic or optical disk and disk drive) coupled to bus 102 for storing information and instructions. Data storage device 110 can include one or more removable magnetic or optical storage media (e.g., diskettes, tapes) which are computer readable memories. Memory units of computer system 100 include 106, 108 and 110. It should be noted that aspects of the present invention may be implemented as a computer program running on computer system 100. Alternatively, aspects of the present invention may be embodied as a computer program stored on a computer-readable medium, such as volatile memory 106 or data storage device 110 (e.g., hard disk, floppy disk, etc.) In accordance with the present invention, signal input output communication device 112 can receive various incoming transaction requests.

Optionally, computer system 100 may also include an alphanumeric input device 114 having alphanumeric and function keys and coupled to bus 102 for communicating information and command selections to central processor unit 104, a cursor control device 116 coupled to bus 102 for communicating user input information and command selections to central processor unit 104, and a display device 118 coupled to bus 102 for displaying information (e.g., text, graphics images). Display device 118 of FIG. 1, utilized with the present invention, may be a liquid crystal device (LCD), cathode ray tube (CRT), or other display device suitable for creating graphic images and alphanumeric characters recognizable to a user. Optional cursor control device 116 allows the computer user to dynamically signal the two dimensional movement of a visible symbol (cursor) on a display screen of display device 118. Many implementations of cursor control device 116 are known in the art including a trackball, mouse, touch pad or joystick. Alternatively, it will be appreciated that a cursor can be directed and/or activated via input from alphanumeric input device 114 using special keys and key sequence commands. The present invention is also well suited to directing a cursor by other means such as, for example, voice commands.

Figure 2:
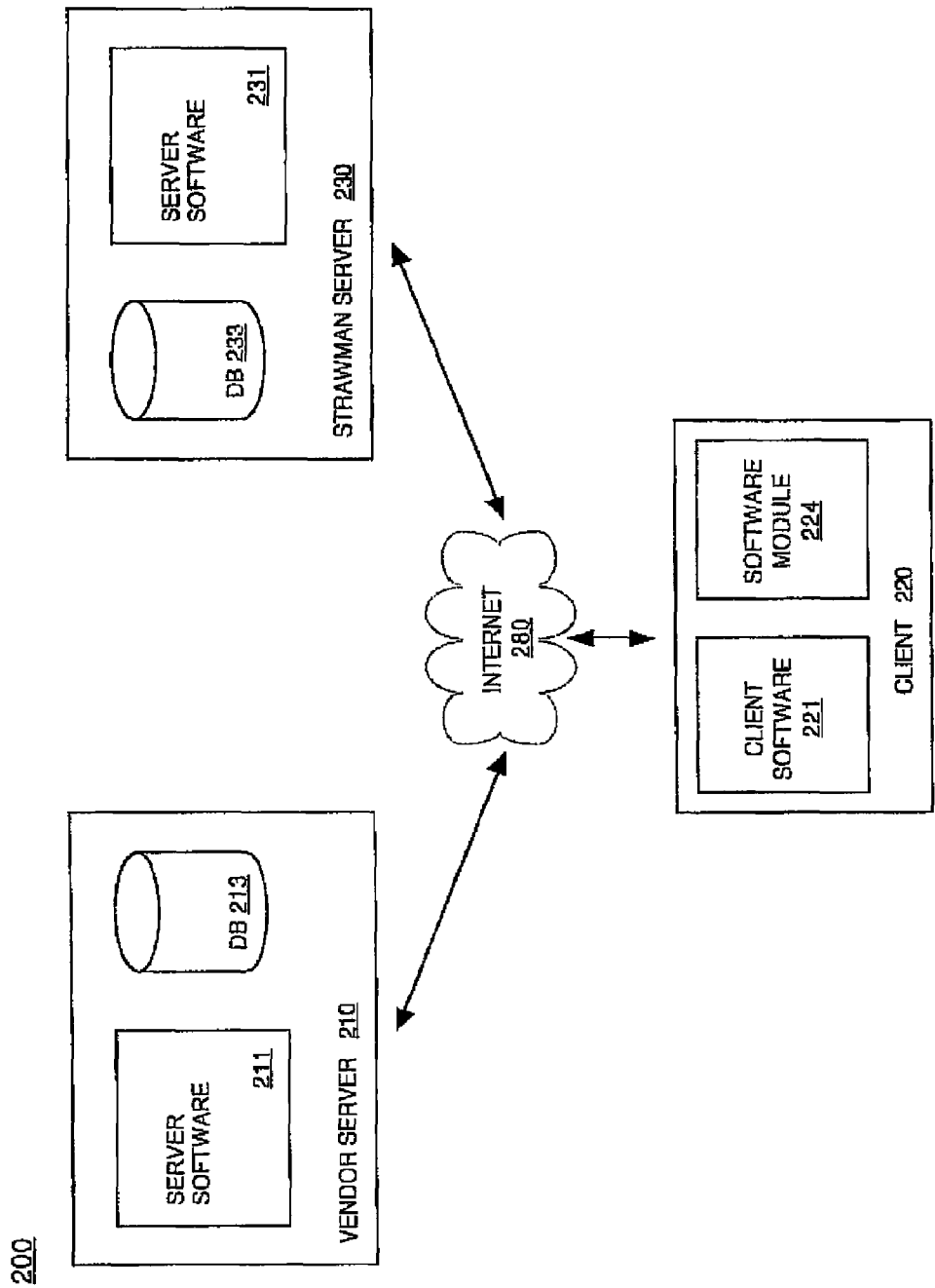
FIG. 2 is a block diagram illustrating an exemplary client-server environment in which embodiments of the present invention can be practiced.

Exemplary Client-Server Environment in Accordance with Embodiments of the Present Invention With reference next to FIG. 2, a block diagram illustrating an exemplary client-server environment 200 in which embodiments of the present invention can be practiced is shown. As illustrated, server systems 210 and 230 as well as client system 220 are coupled to a communication network 280 which, in a currently preferred embodiment, comprises the Internet. Within the scope of the present invention, an e-vendor hosts its Web site on server 210, while an intermediary, or a "strawman", provides its services using server 230.

A consumer-subscriber accesses the e-vendor's Web site on e-vendor server 210 to browse and/or conduct a transaction (e.g., purchasing an item, conducting a financial transaction such as banking or stock trading) using client system 220. In the context of the present invention, an intermediary is an organization or application that let consumers sign up as subscribers, who can then transact business with other entities electronically without revealing their identity to these entities. In effect, in accordance with the present invention, the intermediary acts as an escrow agent and a middleman in a transaction between a consumer-subscriber and a vendor in such a way that the vendor cannot identify or track the customer as an individual. As such, the privacy and anonymity of the consumer-subscriber is preserved.

It is appreciated that computer system 100 of FIG. 1 can be used to implement e-vendor server 210, strawman server 230, and/or client system 220. Generally, though not necessarily, client system 220 is a personal computer (PC), whereas e-vendor server 210 and strawman server 230 are more powerful computer systems with more hardware, software, and network resources.

As illustrated in FIG. 2, e-vendor server 210 can include a database 213 and server software 211, while strawman server 230 can include a database 233 and server software 231. In accordance with the present invention, database 213 can store product description as well as other information for generating Web pages at the e-vendor's Web site, whereas database 233 can store information about the intermediary's subscribers (e.g., name, address, billing preferences, etc.). It is appreciated that such subscriber information can be stored in different databases on strawman server 230. Significantly, in accordance with the present invention, e-vendor server 210 (and hence the e-vendor) does not have access to database 233 or any additional databases on strawman server 230. Database 233 is completely separate from database 213 and is under the sole control of the intermediary. By acting as a middleman on behalf of a subscriber in transactions with an e-vendor in accordance with the present invention, the intermediary is able to completely shield the identity of the consumer-subscriber from the e-vendor. The present invention thus advantageously protects the privacy and anonymity of the consumer-subscriber.

Referring again to FIG. 2, client system 220 includes client software 221. Client software 221 is an application program, such as a browser, a custom GUI (graphical user interface), etc., that allows a user to specify content requests (e.g., clicking on hyperlinks, entering a Universal Resource Locator (URL) or, more generally, a Universal Resource Identifier (URI)) to a server (e.g., e-vendor server 210, strawman server 230) using a network protocol (e.g., various versions of Hypertext Transfer Protocol, such as HTTP or HTTPS, etc.) The request is then handled by the server identified by the URI. Client software 221, server software 211 and 231 have specialized code that allows them to communicate via the chosen network protocol (e.g., in conventional systems the client is usually a browser whereas the server is a web-server). The server returns content as per the request parameters encoded in the URI. This content is delivered in a format that is well understood by client software 211 (e.g., Hypertext Markup Language (HTML), Extensible Markup Language (XML), Standard Generalized Markup Language (SGML), etc.) Upon receipt of the content by client software 211, the content is parsed into an internal data structure (e.g., an abstract syntax tree or graph). The internal data structure is then used to render the content on client software 211 in a human understandable representation, such as text and graphic images.

It is appreciated that the content delivered by the server can include special processing instructions (e.g., get the content from another server via the URI associated with a hyperlink, etc.) Specifically, it is appreciated that Web pages can include content that is stored locally (e.g., on the server hosting the requested Web page) or remotely (e.g., on a server other than the hosting server). As such, if the requested Web page contains URIs that point to another server, client software 221 would request those remote content from the other server. In other words, the hosting server and the other server need not communicate directly even if the requested Web page includes remote content.

Description of the Operation of Embodiments of the Present Invention

With reference still to FIG. 2, in one embodiment of the present invention, e-vendor server 210, strawman server 230, as well as client 220 are coupled to the Internet 280. Using client software 221 on client 220, a customer accesses the intermediary's Web site hosted on strawman server 230. Prior to using the services provided by the intermediary, a consumer needs to establish an account with the intermediary and become a subscriber. An account is necessary for the intermediary to attribute each transaction conducted through the intermediary to the appropriate subscriber and process the transaction (e.g., shipping, billing) accordingly. Thus, within the scope of the present invention, a customer-subscriber establishes an ongoing relationship with the intermediary in lieu of having to set up numerous accounts with different e-vendors. Once a subscriber account has been established, the consumer-subscriber can conveniently transact business with different e-vendors anonymously, with the intermediary acting on the consumer-subscriber's behalf in each transaction.

In accordance with one embodiment of the present invention, when a new user visits the intermediary's Web site to subscribe to the intermediary's services, the user is prompted to provide requisite personal information, such as the user's name and address, so that an account profile can be created for the user. Optionally, if the new subscriber so desires, additional information such as credit card information and personal preferences can also be stored within the customer's profile so that the customer does not need to enter the information every time a transaction is being entered into. In a currently preferred embodiment, user account profiles are stored in database 233 of strawman server 230.

Referring again to FIG. 2, in a currently preferred embodiment, a software module 224 is downloaded from strawman server 230 to client 220 as part of the user registration process. In an alternative embodiment, software module 224 can be provided to the consumer on a computer readable medium (e.g., CD-ROM, diskette) instead of being downloaded over the Internet 280. In yet another embodiment, software module 224 (e.g., program code written in a scripting language) is downloaded dynamically from strawman server 230 to client system 220 each time the consumer-subscriber logs into his/her account at the intermediary's Web site. In accordance with the present invention, software module 224 runs on client system 220 and serves to communicate actions of the consumer-subscriber to strawman server 230 in a given transaction so that the intermediary's services can be properly rendered if the consumer-subscriber so chooses.

More specifically, once a consumer becomes a subscriber to the intermediary's services, the consumer-subscriber can decide on a transaction-by-transaction basis whether to make use of the services or not in any given transaction. Occasionally, the consumer-subscriber may decide that anonymity is not critical in a particular transaction. In that case, the consumer-subscriber would simply engage in the transaction directly with the e-vendor without going through the intermediary. In such transactions, strawman server 230 is not involved and software module 224 needs not be active on client system 220.

On the other hand, when the consumer-subscriber wants to transact business anonymously through the intermediary, then in one embodiment of the present invention, the consumer-subscriber would launch software module 224 on client system 220 before initiating the desired transaction. In another embodiment, software module 224 is launched automatically when the consumer-subscriber starts the browser program on client system 220. Once it is up and running on client system 220, software module 224 works in conjunction with client software 221 to communicate with strawman server 230 in accordance with one embodiment of the present invention. Stated differently, software module 224 and client software 221 together generate and present the user interface (UI) 320 (described below with reference to FIGS. 3A, 3B, 3C and 3D) of the present invention.

Figure 3A:
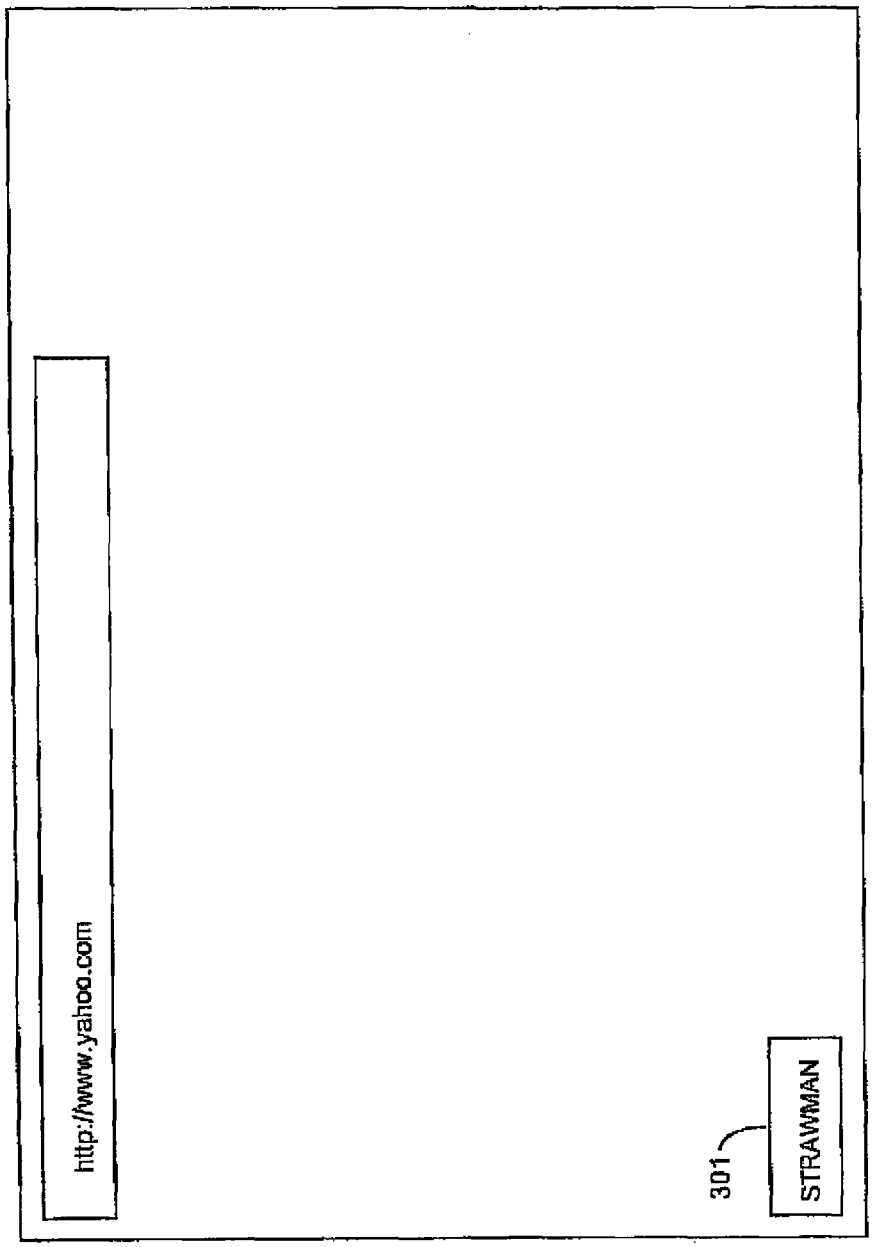
FIGS. 3A, 3B, 3C and 3D are diagrams illustrating exemplary screen shots as observed by a consumer-subscriber during various stages of a transaction with a vendor through an intermediary in accordance with one embodiment of the present invention.

FIGS. 3A, 3B, 3C and 3D are diagrams illustrating exemplary screen shots as observed by a consumer-subscriber during various stages of a transaction with a vendor through an intermediary in accordance with one embodiment of the present invention. Referring now to FIG. 3A, in one embodiment of the present invention, a button 301 is visible on the display (e.g., display device 118) of client system 220 when software module 224 is running. The consumer-subscriber can at any time click on button 301 to log into his/her account with the intermediary. In a currently preferred embodiment, when the consumer-subscriber clicks on button 301, the consumer-subscriber is prompted to enter his/her user name and password for authentication purposes. As described above, the consumer-subscriber has completion discretion as to whether to use the intermediary's services or not for a particular transaction. Thus, if the consumer-subscriber decides not to use the services, there is no need to log into his/her account with the intermediary in accordance with the present invention. Under those circumstances, the consumer-subscriber proceeds to perform the desired transaction directly with the e-vendor at its Web site without the involvement of the intermediary, as if the consumer-subscriber has never signed up for the services.

Figure 3B:
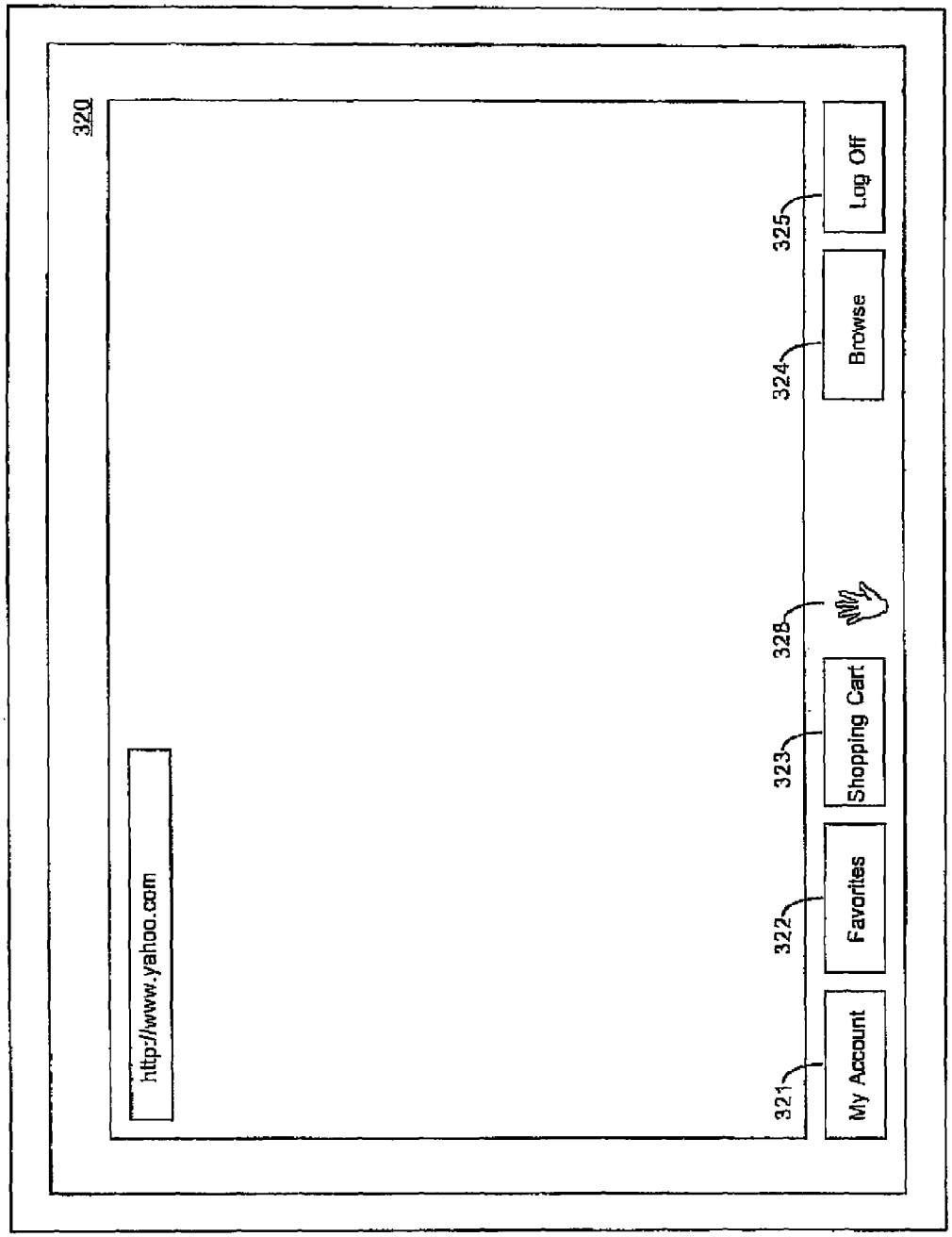

Referring now to FIG. 3B, when the consumer-subscriber is logged into his/her account, in a currently preferred embodiment, software module 224 launches a user interface (UI) 320 to facilitate anonymous transaction(s) based upon the consumer-subscriber's actions as described below. Included in UI 320 of this embodiment are buttons 321, 322, 323, 324 and 325 as well as an icon 328. More specifically, in this embodiment, button 321 is labeled "My Account" and when clicked brings up within UI 320 a "My Account" screen, which is described with reference to FIG. 3D below. When button 322, labeled "Favorites" in this embodiment, is clicked, a list of the consumer-subscriber's favorite Web sites for electronic transactions (e.g., based on past transactions and/or user entries) is displayed within UI 320, allowing the consumer-subscriber to access any of those sites by a simple click.

Moreover, with reference still to FIG. 3B, clicking button 323 lets the consumer-subscriber bring up the "Shopping Cart" screen. In a currently preferred embodiment, the "Shopping Cart" screen tabulates in a highly readable fashion those item(s) with which transactions are pending (e.g., products which have been selected by the consumer-subscriber for purchase but the transaction has yet to be finalized because the consumer-subscriber is still browsing and/or shopping for additional item(s)) so that the consumer-subscriber can easily review the selected item(s) and make any changes as necessary prior to submitting the transaction for processing.

With reference still to FIG. 3B, button 324 is a "Browse" button that, in one embodiment, takes the consumer-subscriber directly to the last Web site visited while logged on to his/her account. This enables the consumer-subscriber to conveniently return to the place where he/she left off to complete a transaction that was interrupted or otherwise postponed. To log off from his/her account, the consumer-subscriber clicks on "Logoff" button 325. In one embodiment, the consumer-subscriber is prompted to confirm that he/she desires to log off. Once logged off, the consumer-subscriber needs to re-login in order to use the intermediary's services. Furthermore, in this embodiment, icon 328 is depicted as a hand-shaped object within UI 320. Clicking on icon 328 puts the consumer-subscriber in a so-called "grab" mode, in which the consumer-subscriber can easily select items presented at an e-vendor's Web site, described below with reference to FIG. 3C.

It should be appreciated that the specific features of UI 320 described herein with respect to the instant embodiment are merely illustrative and are not intended to limit the present invention thereto. Rather, certain features can be omitted and/or additional features not specifically mentioned herein can be included without departing from the scope and spirit of the present invention. Moreover, in one embodiment, a subset of the features within UI 320 can be hidden from view or disabled under the control of software module 224 whenever those features are not applicable under the circumstances (e.g., "Logoff" button 325 is not displayed when the consumer-subscriber is not logged on) to present a clean, uncluttered look to the consumer-subscriber and to facilitate easy navigation.

Figure 3C:
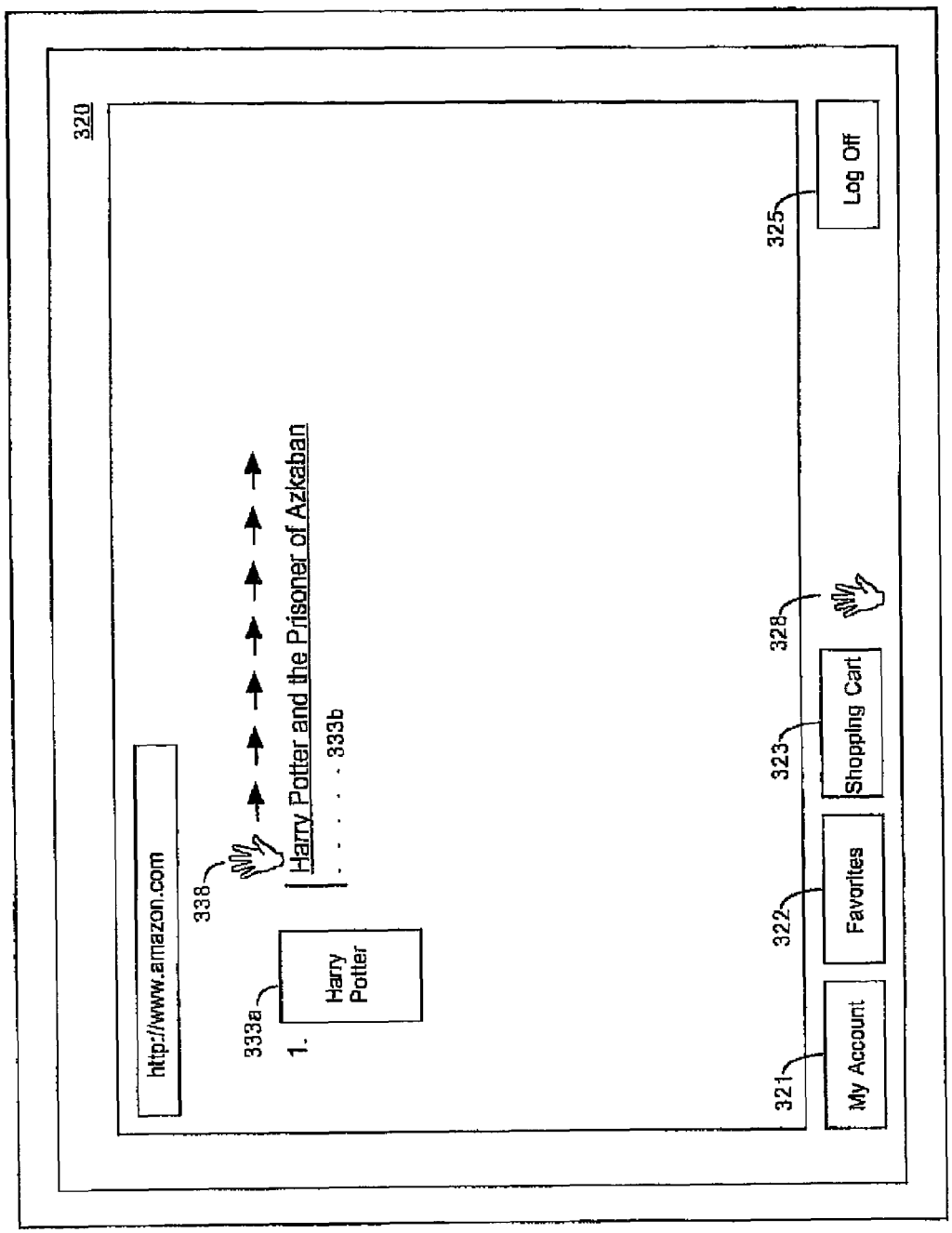

Referring next to FIG. 3C, once the consumer-subscriber is logged into his/her account, in a currently preferred embodiment, the consumer-subscriber can proceed to browse item(s) on a e-vendor's Web site in the usual fashion (e.g., by clicking on different hyperlinks). In this embodiment, when the consumer-subscriber finds a particular item of interest at the e-vendor's Web site (e.g., a product that the consumer-subscriber wants to purchase from the e-vendor), the consumer-subscriber activates the "grab" mode by clicking on icon 328. In one embodiment, upon such clicking of icon 328, the pointer of the pointing device changes from its normal form (e.g., an arrow) to a hand shape pointer 338 resembling icon 328, whereupon the consumer-subscriber can indicate his/her selection with pointer 338. In a currently preferred embodiment, the consumer-subscriber swipes pointer 338 across the hyperlink (e.g., product icon 333a, text link 333b) representing the desired item to indicate its selection. In another embodiment, the consumer-subscriber employs a drag-and-drop action (e.g., click and hold pointer 338 on the item of interest, move pointer 338 to a designated location within UI 320, such as a shopping cart icon (not shown in FIG. 3B) and then release the item thereupon) to indicate the desired selection. Other embodiments are also possible wherein the consumer-subscriber signifies his/her selection of the item of interest by way of other combinations of user input (e.g., clicks and movements of a mouse, text entry via a keyboard).

Significantly, within the scope of the present invention, the information of the selection (e.g., what item has been selected by the consumer-subscriber and at which e-vendor Web site) is transmitted to strawman server 230 through the consumer-subscriber's client software 221 and software module 224 in a transparent manner. However, the e-vendor remains totally uninformed as to the identity of the consumer-subscriber because no information about the consumer-subscriber is transmitted to the e-vendor. Moreover, in one embodiment, information about the pending transaction is not yet conveyed to the e-vendor thus far.

Once strawman server 230 has received the selection information, strawman server 230 initiates a transaction with the e-vendor on behalf of the consumer-subscriber based on the selection information. Importantly, within the scope of the present invention, strawman server 230 provides to the e-vendor information about the intermediary for purposes of conducting the transaction (e.g., in a purchase transaction, the product is shipped to the intermediary and billed to the intermediary's account as if the intermediary is the end-user) without ever revealing any information about the consumer-subscriber, who is the real party to the transaction behind the scene, to the e-vendor. As such, the present invention completely shields the identity and transaction history of the consumer-subscriber from the e-vendor, thus preserving the anonymity and privacy of the consumer-subscriber in each and every transaction conducted via the intermediary.

In one embodiment of the present invention, the intermediary establishes accounts in its name with numerous e-vendors and furnishes a list of all those e-vendors with whom it has such accounts to its subscribers. The subscribers can then transaction business with any of the e-vendors on that list through the intermediary. In this embodiment, the intermediary collects and indexes multiple e-vendors under a single Web site so that consumers can comparison shop and/or choose from among different e-vendors all from the same site, thus offering added convenience and flexibility to savvy on-line consumers.

In another embodiment, the consumer-subscriber is able to transact business with any e-vendor of his/her choice through the intermediary. In this embodiment, once the consumer-subscriber's selection is received at strawman server 230, it determines whether an established account already exists between the intermediary and the e-vendor chosen by the consumer-subscriber. If an account is already in existence, strawman server 230 simply logs into the account and conducts the transaction based on the selection information. On the other hand, if there is no established account relationship between the intermediary and the e-vendor of choice, strawman server 230 proceeds to set up an account with the e-vendor in the name of the intermediary, and then the transaction as requested by the consumer-subscriber is conducted using the newly established account.

Once again, it is important to note that in all embodiments of the present invention the e-vendor is merely aware that it is transacting business with the intermediary but is at all times without any knowledge as to who the ultimate consumer is. By acting in a capacity similar to that of an escrow agent but in addition shielding the identity of the consumer-subscriber from the e-vendor, the intermediary advantageously protects the anonymity and privacy of the consumer-subscriber in each and every transaction conducted in accordance with the present invention.

Figure 3D:
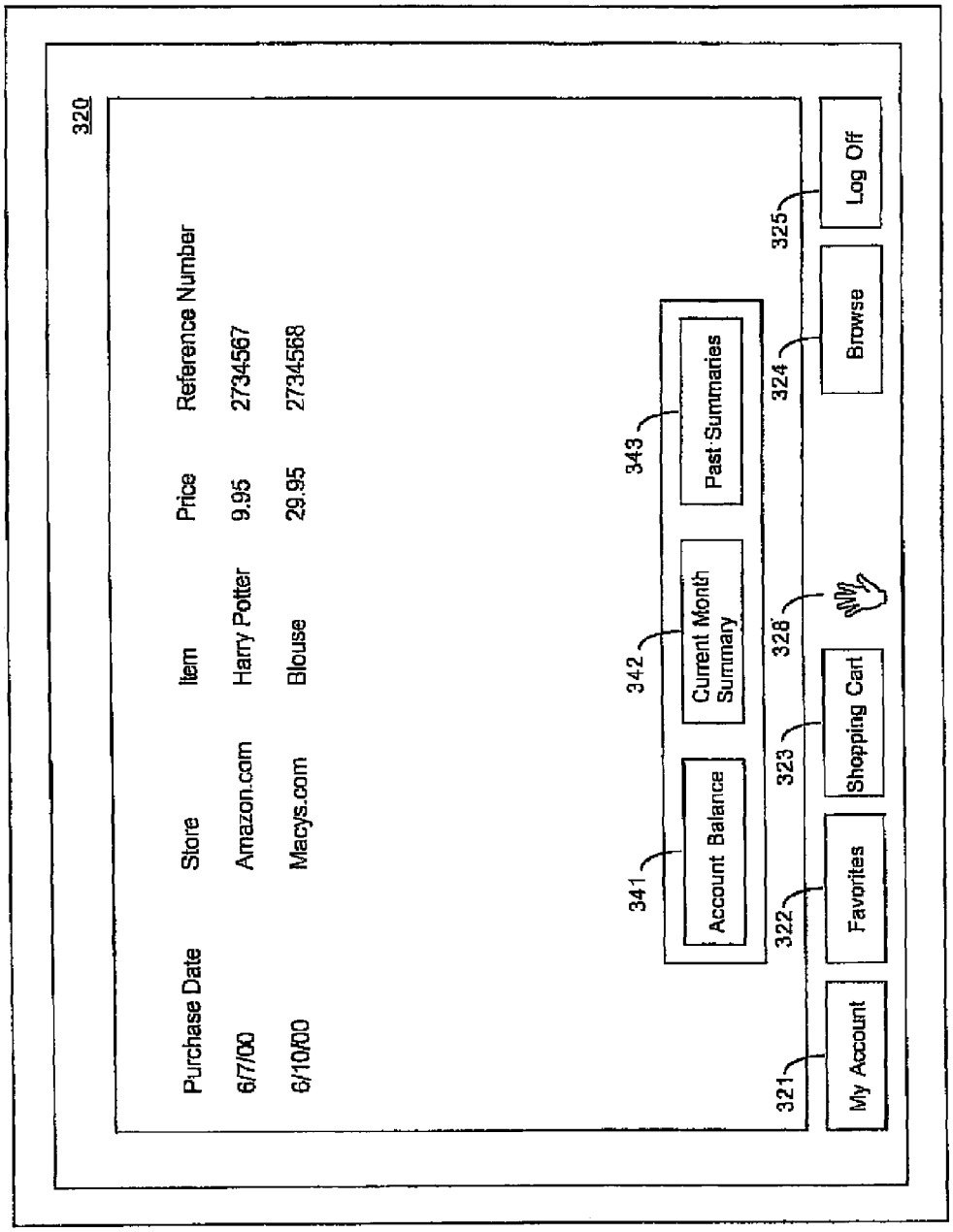

With reference next to FIG. 3D, in one embodiment, a "My Account" screen appears within UI 320 when the consumer-subscriber clicks on "My Account" button 321. In this embodiment, the "My Account" screen displays within UI 320 those transactions that have been consummated through the account to date. In one embodiment, "My Account" screen of UI 320 includes an "Account Balance" button 341 which, when clicked, brings up the outstanding balance on the consumer-subscriber's account. Moreover, in one embodiment, the consumer-subscriber can specify a period such that transactions entered into during that period are displayed. Thus, as shown in FIG. 3D, pressing "Current Month Summary" button 342 would limit the displayed entries to those transactions that have occurred during the current month (e.g., the current billing cycle or statement period). Likewise, clicking "Past Summaries" button 343 would allow the consumer-subscriber to bring up older transactions in a summary format.

Furthermore, referring still to FIG. 3D, in one embodiment, the consumer-subscriber can sort the displayed entries using various criteria (e.g., by date, by e-vendor, by transaction amount, by transaction type, etc.) so that the consumer-subscriber can easily review the selected item(s) and make any changes as necessary prior to submitting the transaction for processing. Additionally, in one embodiment, the consumer-subscriber can click on a particular entry displayed within the "My Account" screen to bring up tracking information (e.g., whether the item has been shipped in a purchase transaction) for the corresponding transaction. It is appreciated that these and other account maintenance features provided by the present invention beneficially afford the consumer-subscriber a centralized, consolidated view of all the electronic transactions conducted through his/her account with the intermediary, thus eliminating the inconvenience and burden of having to keep track of activities with each and every vendor separately.

Moreover, in a currently preferred embodiment, even after the consumer-subscriber has received shipment of the ordered item(s) from the intermediary in a purchase transaction, additional services are available to the consumer-subscriber with respect to those items. More particularly, the consumer-subscriber may want to return the item, to exchange the item for other merchandise, to have the item sent in for repairs, to submit a warranty card or a rebate request, or to request other post-delivery services regarding the item(s) ordered through the intermediary using the subscriber's account. To that end, the consumer-subscriber can submit such post-delivery requests to the vendor or manufacturer through the intermediary. Importantly, the consumer-subscriber again is able to benefit from the advantages offered by the intermediary's services, namely, to remain anonymous with respect to the vendors and manufacturers, who are uninformed as to the identity of the ultimate consumer but are merely aware that business is being transacted with the intermediary.

Figure 4:
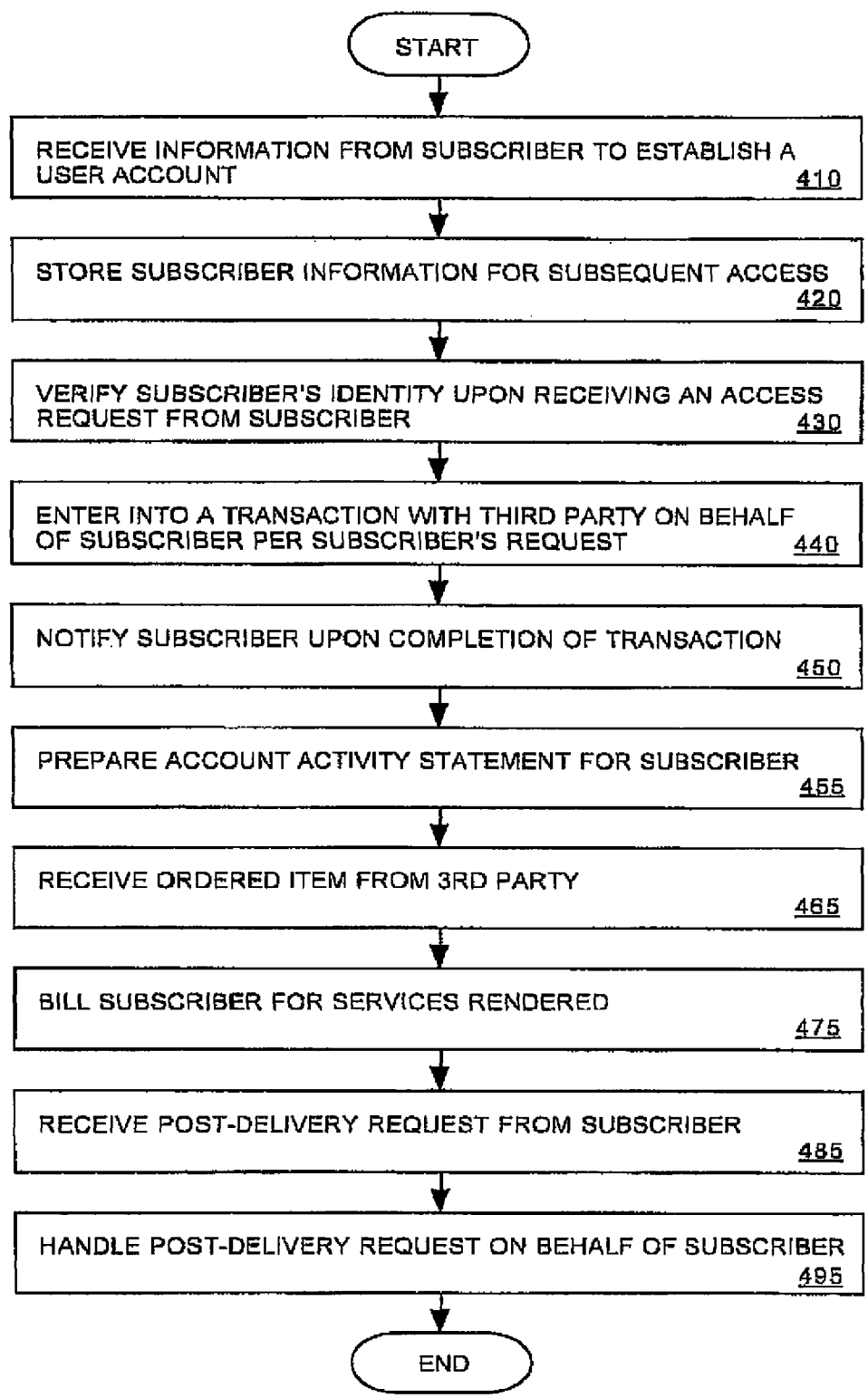
FIG. 4 is a flow diagram illustrating steps for facilitating a transaction between a consumer-subscriber and a vendor through an intermediary in accordance with one embodiment of the present invention.

Referring next to FIG. 4, a flow diagram illustrating steps for facilitating a transaction between a consumer-subscriber and an e-vendor through an intermediary in accordance with one embodiment of the present invention is shown. In step 410, personal information of the subscriber is received by the intermediary for establishing a user account with the intermediary as described above.

Referring still to FIG. 4, in step 420, the personal information received in step 410 is stored by the intermediary for subsequent access. In one embodiment, the information is stored in database 233 of strawman server 230. In a preferred embodiment, the information is stored in a highly secured fashion and access thereto is subject to special security measures so that the information is safely protected from unauthorized access or tampering by malicious hackers.

With reference still to FIG. 4, in step 430, a request to access the user account is received at the intermediary from the subscriber, upon which the subscriber's identity is verified by the intermediary against the personal information as stored in step 420. In a currently preferred embodiment, step 430 is performed when a consumer-subscriber attempts to log into his/her account.

Referring again to FIG. 4, in step 440, the intermediary enters into a transaction with the vendor on behalf of the subscriber according to instruction given by the subscriber. In a currently preferred embodiment, the subscriber specifies what action is to be performed by the intermediary on his/her behalf (e.g., what item to purchase at an e-vendor Web site) through UI 320 as described above with reference to FIG. 3C.

With reference again to FIG. 4, in step 450, upon the completion of the transaction, the subscriber is notified as such. It should be appreciated that the notification can be implemented in various ways within the scope of the present invention. In one embodiment, a confirmation message is displayed on the screen within UI 320 immediately after completion of the transaction while the consumer-subscriber is still logged on to his/her account. In another embodiment, an electronic mail (e-mail) message is sent to the consumer. In still another embodiment, a confirmation notice is physically sent to the consumer's address on record. Importantly, in whatever way the consumer-subscriber and the intermediary communicate as it relates to the transaction, in accordance with the present invention, the transaction is completed without disclosing the subscriber's personal information to the vendor, as has been described in detail above.

Referring still to FIG. 4, in optional step 455, an account activity statement is prepared for the subscriber, which statement includes information about transactions completed through the user account during a statement period. In a currently preferred embodiment, such a statement is presented to the subscriber via UI 320 upon request, as described above with reference to FIG. 3D. Alternatively, in another embodiment, a statement is prepared, as a paper copy, in a periodic fashion (e.g., monthly) and sent to the subscriber.

Referring again to FIG. 4, in optional step 465, an item ordered from the vendor on behalf of the subscriber pursuant to the subscriber's instruction is received at the intermediary. In accordance with one embodiment of the present invention, the subscriber is notified upon the receipt of the ordered item, and the item is held at the intermediary awaiting pick-up by the subscriber. Alternatively, in another embodiment, the item is simply shipped to the subscriber upon its receipt at the intermediary. In optional step 475, the subscriber is billed for services rendered by the intermediary. In one embodiment, the intermediary can provide financing (e.g., credit purchase) to the consumer-subscriber, so that the amount billed to the consumer-subscriber may include finance charges and interests in addition to actual total purchase price of items ordered, account fees, and other agreed upon service charges. Once again, the consolidated billing and other account maintenance features provided by the present invention advantageously allow the consumer-subscriber to manage all the electronic transactions in a centralized, organized fashion through his/her account with the intermediary, thus ridding the inconvenience and burden of disjointed account maintenance that inevitably results from having to deal with records from numerous vendors.

With reference again to FIG. 4, in optional step 485, a post-delivery request regarding the ordered item is received at the intermediary from the subscriber. Then, in optional step 495, the post-delivery request is handled by the intermediary on behalf of the subscriber. As described previously, the post-delivery request can be a return request, a repair request, an exchange request, a warranty submission request, a rebate request, or any other request that concerns the item ordered through the intermediary using the subscriber's account. By further providing these value-added services to the consumer, the intermediary can offer a superior customer experience and premier services to its subscribers, setting itself apart from the competition of pure merchandising and/or catalog Web sites. A method for facilitating a transaction between a consumer-subscriber and an e-vendor through an intermediary in accordance with embodiments of the present invention has thus been described.

Significantly, since the method of the present invention as described is highly configurable, it can easily be tailored for use with a wide spectrum of e-commerce Web sites which have different layouts and navigation paradigms. Moreover, the consumer-subscriber does not have to get involved with the underlying aspects of the present invention. More specifically, embodiments of the present invention (e.g., software module 224 of FIG. 2) can be automatically configured so that it adapts to the characteristics of a Web site. As such, the present invention provides a ubiquitous solution for the subscribing consumer.

The foregoing description thus clearly demonstrates that intermediary services implemented in accordance with embodiments of the present invention are highly advantageous to the consumer-subscriber. More particularly, by subscribing to the intermediary services described herein, the consumer-subscriber is not only able to remain anonymous with respect to the e-vendors with whom the consumer-subscriber transacts business, but the consumer-subscriber is also able to eliminate the need to establish and maintain multiple user names and passwords with the individual e-vendors. Additionally, the consumer-subscriber is able to avoid the hassle of having to deal with records from numerous vendors. Instead, the consumer-subscriber enjoys a centralized, consolidated view of all the electronic transactions conducted through his/her account with the intermediary, thus fully avoiding the inconvenience and burden of having to keep track of activities with each and every vendor separately. This greatly simplifies the life of the consumer-subscriber and enhances the electronic transaction experience. Therefore, embodiments of the present invention promote broad consumer acceptance and participation in electronic transactions because of the added assurance that their personal information is better protected and the added convenience of transactions management. Moreover, since the intermediary provides value-added services that are highly desirable to on-line consumers who are increasingly concerned about their privacy and anonymity, the present invention also provides the framework for a viable and profitable business model in the fast evolving environment of e-commerce.

Although certain embodiments of the present invention as described herein pertain primarily to on-line purchases, it is appreciated that many other advantageous applications are possible within the scope of the present invention. For example, the present invention can be advantageously applied to conduct on-line financial transactions, so that a financial institution, as a lender, for instance, needs not and does not know the identity of its borrower as long as the lender can be assured through the intermediary that the borrower meets certain credit-worthiness criteria as prescribed by the lender. In another embodiment, the present invention can be advantageously used in anonymous on-line exchanges of all forms of digital media. Therefore, the present invention enables numerous possibilities in a new paradigm wherein electronic transactions can be conducted anonymously among transacting parties with the aid of an intermediary or "strawman" in accordance with the present invention. It should be clear to a person of ordinary skill in the art, having read the description of embodiments of the present invention herein, that other applications and embodiments not expressly described herein are also possible without departing from the scope and spirit of the present invention.

The preferred embodiment of the present invention, a system and method for implementing an intermediary to preserve user privacy and anonymity in electronic transactions, is thus described. While the present invention has been described in particular embodiments, it should be appreciated that the present invention should not be construed as limited by such embodiments, but rather construed according to the below claims.

What is claimed is:

1. A server-implemented method of facilitating a transaction between a user and a vendor in a communication network, the method comprising:
   creating a user account for the user, the creating including receiving, at the server, a personal profile information including information about the user;
   providing, to the user, displayable entries sortable using criteria to allow the user to review a selection of at least one entry and to make a change to the selection prior to submitting a transaction for processing, wherein the criteria include at least a date, and/or a vendor identification, and/or a transaction type;
   responsive to a user request to log into the user account, verifying an identity of the user;
   responsive to successful identification verification of the user, facilitating the transaction between the vendor and the user pursuant to instructions from the user, wherein the instructions are generated based at least in part on user input to a purchasing user interface (UI) rendered on a display of a client device of the user;
   sending to the user a confirmation message regarding the transaction while the user is logged into the server;
   attributing a plurality of user transactions to the user account; and
   providing to the user an account screen for allowing access to information relating to the user transactions and information relating to an account balance of the user account.

2. The server-implemented method as recited in claim 1, wherein at least a part of a communication from the user to the server is performed based on software downloaded via the Internet to the client device.

3. The server-implemented method as recited in claim 2, wherein the server also accepts an HTTPS communication from the user based on a browser of the client device of the user so that the user can select, per transaction, a communication either through the browser or through the software.

4. The server-implemented method as recited in claim 1, wherein the UI has a hidden object which is non-viewable by the user in the UI.

5. The server-implemented method as recited in claim 1, wherein the personal profile information further includes credit card information and personal preference information.

6. The server-implemented method as recited in claim 1, wherein the account screen also facilitates access to tracking information for a transaction associated with the user account.

7. The server-implemented method as recited in claim 1, further comprising providing integrated services to the user on behalf of a plurality of vendors.

8. The server-implemented method as recited in claim 1, further comprising providing to the user a comparison of offers from different vendors.

9. The server-implemented method as recited in claim 1, further comprising providing the user with a way to return a purchased item.

10. The server-implemented method as recited in claim 1, further comprising facilitating an exchange of an item for other merchandise.

11. The server-implemented method as recited in claim 1, further comprising facilitating processing of a rebate request from the user.

12. The server-implemented method as recited in claim 1, wherein the transaction comprises a financial transaction.

13. The server-implemented method as recited in claim 1, wherein the transaction comprises a purchase of an item and wherein further the server operates as an escrow agent for the transaction.

14. The server-implemented method as recited in claim 1, wherein the transaction comprises a banking transaction and/or a stock trading transaction.

15. The server-implemented method as recited in claim 1, further comprising sending an electronic mail message to confirm the transaction.

16. The server-implemented method as recited in claim 1, wherein the account screen provides an account activity statement prepared for the user and wherein the statement includes information pertaining to transactions completed through the user account during a statement period.

17. The server-implemented method as recited in claim 1, further comprising providing a financing option to the user for the transaction.

18. The server-implemented method as recited in claim 1, wherein the client device is a desktop computer system or a wireless mobile computing device.

19. The server-implemented method as recited in claim 1, wherein the transaction is performed without disclosing certain transaction information to the vendor.

20. An Internet-enabled client device comprising:
   at least one processor;
   at least one display device coupled to the processor; and
   at least one memory coupled to the processor, the memory having stored therein instructions that when executed cause the client device to facilitate a transaction between a user and a vendor in a communication network;
   the processor when executing the instructions being configured for sending, to a server, a personal profile comprising personal information about the user;
   the display device when under control of the processor executing the instructions being configured for displaying a list of entries sortable using specified criteria to allow the user to review a selection of entries and to make a change to the selection prior to submitting a transaction for processing, wherein the specified criteria comprise a date, u a vendor identification, and/or a transaction type;
   the processor when executing the instructions being further configured for initiating a user request to log into a user account created for the user based on the personal profile;
   the processor when executing the instructions being further configured for verifying the user against the personal information and, upon successful verification, sending instructions to facilitate a transaction between the vendor and the user, wherein the instructions are generated based on a shopping cart screen rendered by the client device;
   the processor when executing the instructions being further configured for receiving a confirmation message regarding the transaction while logged in the user account; and the display device when under control of the processor executing the instructions being further for displaying an account screen comprising information relating to user transactions attributed to the user account and further comprising information relating to an account balance of the user account.

\* \* \* \* \*